United States Patent [19]

Dubois et al.

[11] 4,201,306
[45] May 6, 1980

[54] VARIABLE CAPACITY ALL-PLASTIC DRUM

[75] Inventors: Robert A. Dubois; George F. Smith, both of Marion, Ohio

[73] Assignee: Greif Bros. Corporation, Delaware, Ohio

[21] Appl. No.: 955,352

[22] Filed: Oct. 27, 1978

[51] Int. Cl.² .............................................. B65D 25/00
[52] U.S. Cl. ..................................... 220/5 R; 156/69; 156/273; 220/67; 220/319
[58] Field of Search ....................... 220/66, 77, 76, 80, 220/5 R, 320, 321, 4 A, 67, 319; 229/5.5, 5.7; 264/323, 22, 25, 26; 156/69, 273; 285/287, 297, 294, 21; 215/211, 232, 233

[56] References Cited

U.S. PATENT DOCUMENTS

| | | | |
|---|---|---|---|
| 339,036 | 3/1886 | Wilbur | 285/294 |
| 2,741,402 | 4/1956 | Sayre | 220/67 X |
| 2,802,593 | 8/1957 | Slaughter | 220/359 |
| 3,072,517 | 1/1963 | Gaylord | 220/67 X |
| 3,095,112 | 6/1963 | Weinstein | 220/67 |
| 3,276,657 | 10/1966 | Speas | 220/80 X |
| 3,432,072 | 3/1969 | Quercia | 220/67 |
| 3,509,252 | 4/1970 | Baehr | 264/323 X |
| 3,696,962 | 10/1972 | Fehres | 220/319 |
| 3,706,176 | 12/1972 | Leatherman | 156/69 X |
| 3,734,393 | 5/1973 | Stump | 229/5.5 X |

Primary Examiner—Allan N. Shoap
Attorney, Agent, or Firm—Kane, Dalsimer, Kane, Sullivan and Kurucz

[57] ABSTRACT

An all-plastic drum construction permits a variety of sizes and capacity of drum by utilizing an extruded tube for the drum side walls of selected diameter and length proportional to the drum capacity desired. An injection molded bottom closure is welded to the bottom end of the tube by a thermoplastic bonding material having dispersed iron particles which are excited when exposed to induction heating thereby facilitating the melting of the thermoplastic. This welding material is disposed within a cavity defined by the bottom closure and bottom end of the tube and when subjected to induction heating and pressure fills the cavity to effectuate the bond between surfaces of the bottom closure and bottom end of the tube. A tight head drum is formed by securing by a similar welding technique a top closure to the upper end of the tube. In forming an open head drum, a thermoplastic chime is initially welded in similar fashion to the upper end of the tube. Thereafter, a top cover is releasably secured to the chime by a locking rim assembly.

16 Claims, 8 Drawing Figures

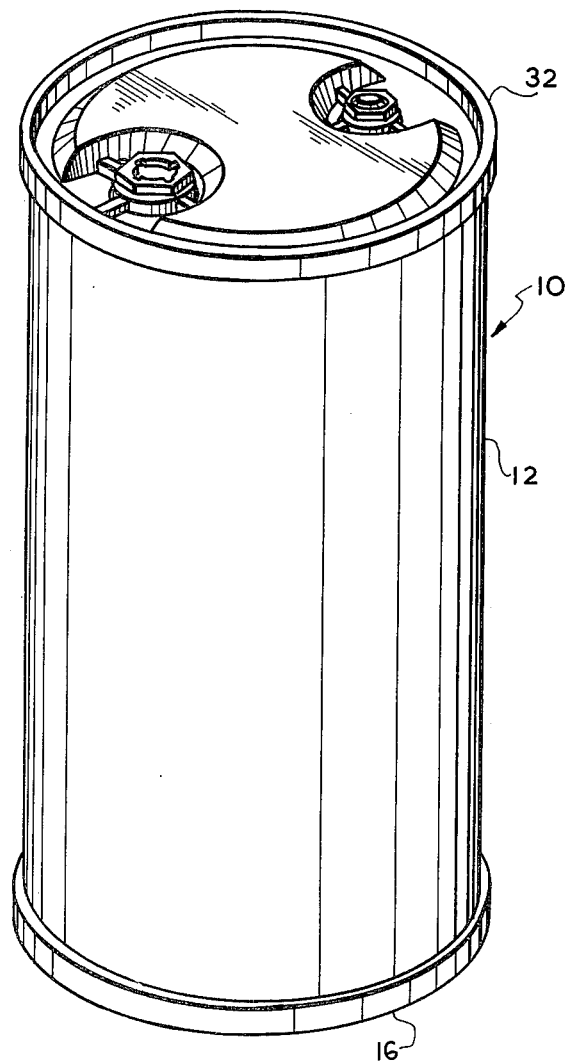
FIG. 1
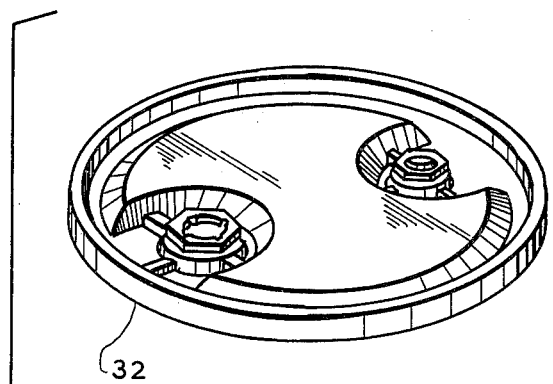
FIG. 2
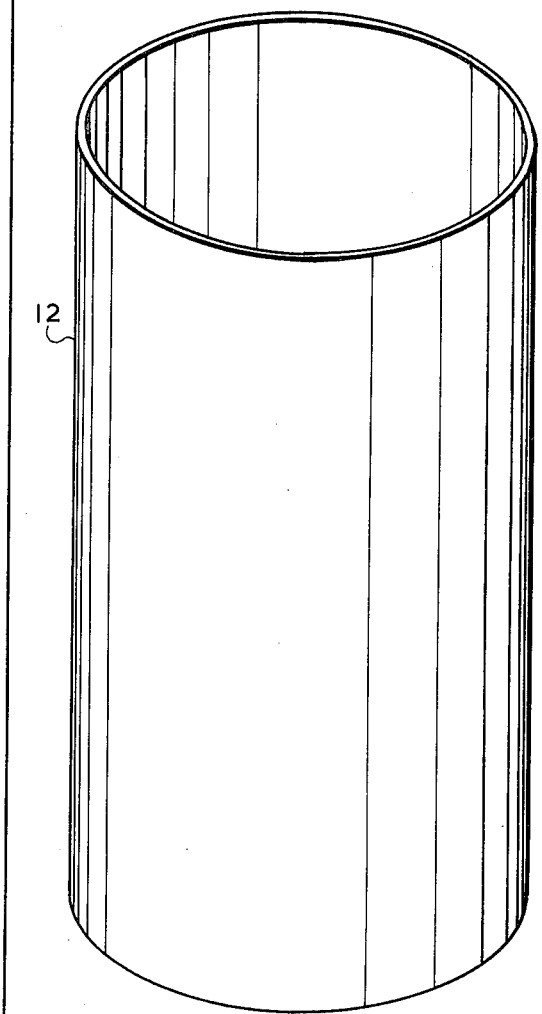
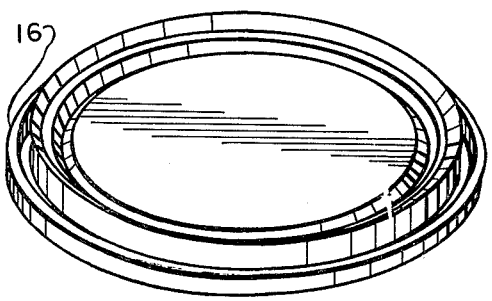

VARIABLE CAPACITY ALL-PLASTIC DRUM

BACKGROUND OF THE INVENTION

1. Field of Invention

This invention relates to the field of all-plastic drums of the heavy-duty, industrial type for shipping and storing liquids, semi-liquids, as well as many other forms of bulk material.

2. Prior Art

In recent years, many different types of drums have been proposed, particularly for liquid and semi-liquid materials, such as plastic lined fiber or metal drums and all-plastic blow-molded drums. Drums having outer shells of fiber and metal, while providing needed strength and rigidity, also add considerable weight to the final product. In many cases, fiber shells are subject to deterioration if exposed to heat, cold, water, or ice for any extended periods of time.

All plastic blow-molded drums, while effective for shipping and storing materials, are limited in their ability to be mass-produced because of the requirement that they be subjected to considerably long cooling cycles in order to permit the resin to adequately harden and set following the blow molding cycle.

One of the drawbacks of any blow molding operation is the inherent non-uniformity of thickness of the walls of the ultimately formed drum with some portions of the drum having considerably more thickness than required while others possessing zones of weakness which may ultimately cause rupture and failure at these locations during drum use and abuse.

There have been attempts to provide an all plastic drum by assembling a pre-formed tubular body member with pre-formed top and bottom closures. The top and bottom closures were secured to opposite ends of the body member by the use of metal chimes. A drum of this construction is disclosed in U.S. Pat. No. 3,955,705 granted May 11, 1976. While a drum of this type has met with success, it will be apparent that the metal chime strips add weight to the product and also require additional manufacturing steps in order to complete the assembly of the finished product.

SUMMARY OF THE INVENTION

A principal object of the present invention is to provide an all-plastic drum that is efficiently manufactured from a minimum number of pre-formed parts of controlled and uniform thickness throughout and at the same time satisfy the Department of Transportation's requirements and specifications, and, specifically, its pressure and drop tests.

Another object is to provide a drum of the foregoing type which does not employ metal chime strips while eliminating the requirement and use of corrosive materials from the drum's construction.

A further object is to provide a drum of the foregoing type which does not rely on time-consuming and expensive blow-molding techniques, but, to the contrary, permits industrial drums to be quickly formed and enables the manufacturer to realize significant cost savings in the process.

The drums of the present invention are made by extruding a tube from selected resinous material having substantially uniform diameter and thickness throughout. The extruded tubes are cut off in length depending on the size and capacity of the drum desired. The top and bottom of the drum are pre-molded by an injection molding technique. The bottom is closed by welding the bottom closure across one of the open ends of the selected extruded tube. In accordance with one embodiment of the invention, a tight head can be achieved by welding the top closure directly to the other open end of the extruded tube. On the other hand, an open head is attained by welding a pre-formed injection-molded chime directly to this open end of the tube. A pre-formed cover can then be releasably secured over the chime of the open head drum, as for example, by a suitable locking rim assembly.

Other objects and advantages will become apparent from the following detailed description which is to be taken in conjunction with the accompanying drawings.

BRIEF DESCRIPTION OF THE DRAWINGS

In the drawings:

FIG. 1 is a perspective view of a fully assembled drum having a tight head fabricated in accordance with the present invention;

FIG. 2 is an exploded perspective view of the drum of FIG. 1;

Figure 3:
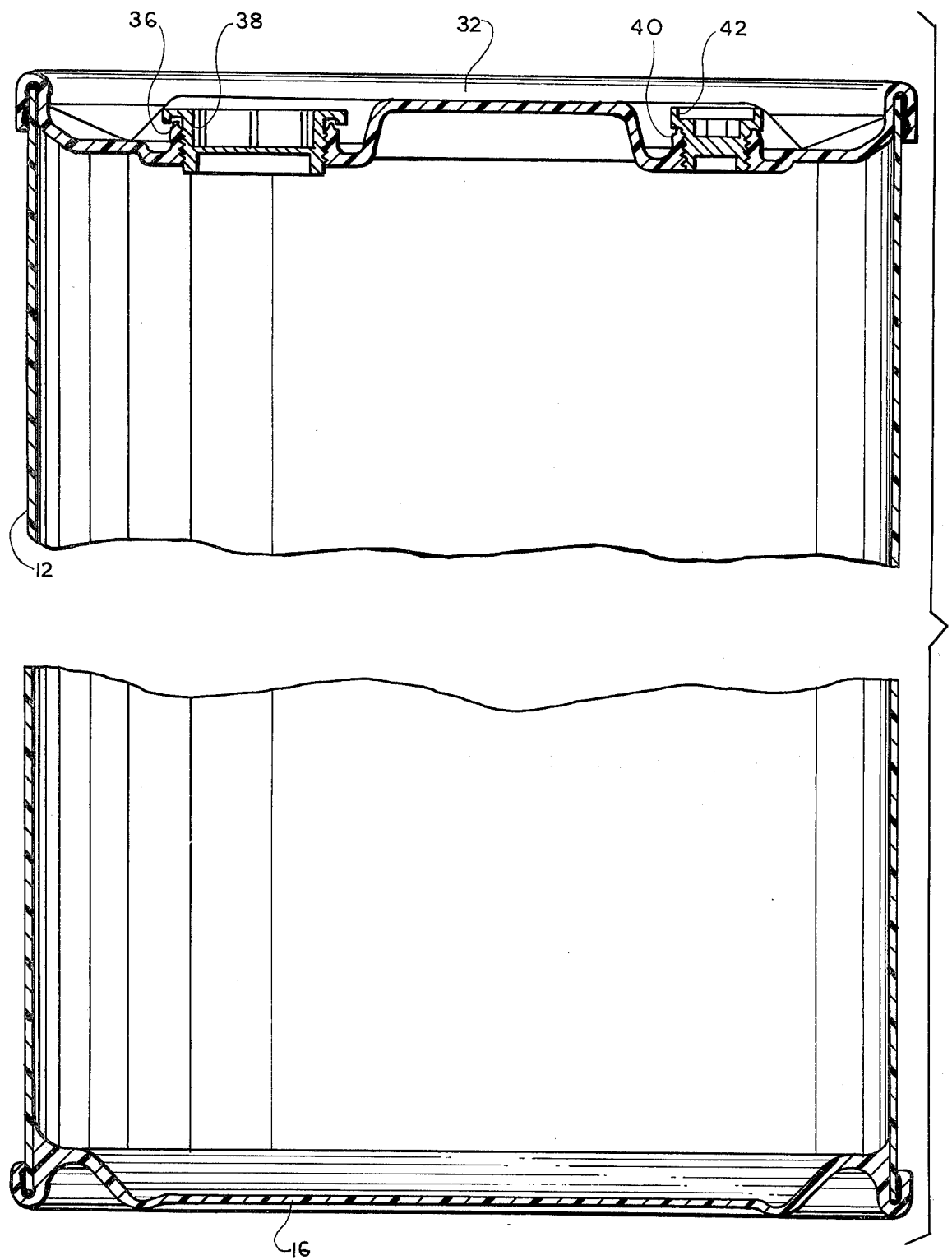
FIG. 3 is a longitudinal sectional view of the drum of FIG. 1.

In the drawings, a drum 10 incorporating the teachings of the present invention includes an extruded tube 12 forming the side walls of the drum. The tube may possess any selected diameter and length depending on the capacity of drum desired. Inherent in the extrusion technique is the ability to control the thickness of the side walls of the tube 12 so that it is varied at pre-set locations along the tube length or is of substantial uniform thickness throughout.

At the bottom end 14 of the tube 12 is secured bottom closure 16. This bottom closure 16 assumes any one of many different configurations depending upon the application of drum contemplated. Nevertheless, the bottom closure 16 preferably includes a peripheral circumferentially extending apron 18 adapted to engage with the internal surfaces of the bottom end 14 of the tube 12. This apron 18 terminates in a lateral radially extending shoulder 20 which as will be evident shortly, may be somewhat spaced from the terminal end of the bottom 14 of the tube 12. This flange merges into an upwardly extending skirt 22 designed to advantageously extend around and be outwardly spaced from the outer surface of the bottom end 14 of the tube 12. This skirt terminates in an inwardly projecting flange 24 that engages with the outer face of the bottom end 14 of the tube 12 for purposes of retaining welding material in the void between the inner faces of the apron 18, flange 20 and skirt 22 during the welding operation. This welding material effectively bonds the bond closure 16 to the bottom end 14 of the tube 12.

Figure 6:
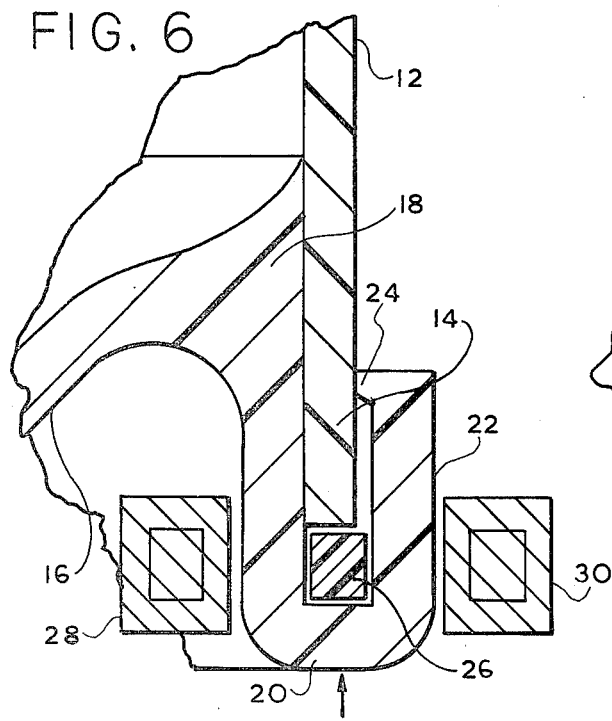
FIG. 6 is an enlarged fragmentary sectional view of the bottom end of the tube showing the bottom closure in the process of being welded thereto.

Referring now to FIG. 6, and specifically to the manner of welding the bottom closure 16 to the bottom end 14 of the tubular shell 12, the bottom closure 16 and tubular shell 12 are initially assembled as shown with the apron 18 disposed within the bottom end 14 in intimate contact with the internal surfaces thereof and the skirt 22 disposed exteriorly of this end. In order to facilitate this assembly, suitable jigs or fixtures may be employed for such purposes. However, prior to this assembly, a strand or slug 26 of the selected welding material is disposed on the flange 20 between apron 18 and skirt 22 so that during the assembly process it will be interposed between the bottom end 14 and flange 20. This strand 26 preferably extends completely around the lower end 14 and consequently assumes a substantially circular circumferentially extending configuration. In accordance with the present invention, this strand 26 is preferably extruded from a relatively high density thermoplastic and, specifically, polyethylene containing iron powder which is used as an excitation medium that facilitates or expedites the melting of the polyethylene. This material is supplied by EMA Bond, Inc., 27 Forest Ave., Englewood, N.J. and thermoplastic bonding systems contemplated herein are described in detail in U.S. Pat. Nos. 3,620,875 and 3,620,876.

In accordance with a preferred embodiment of the invention, the closures at both the top and bottom and tube 12 as well as the other welded parts are preferably of high density polyethylene. However, it should be understood that the process herein is based on induction heating principles which fuse any thermoplastic material to itself or to dissimilar thermoplastics plus paper, aluminum and thermosets. The process provides simple, clean, rapid and reliable assembly of the parts.

Figure 7:
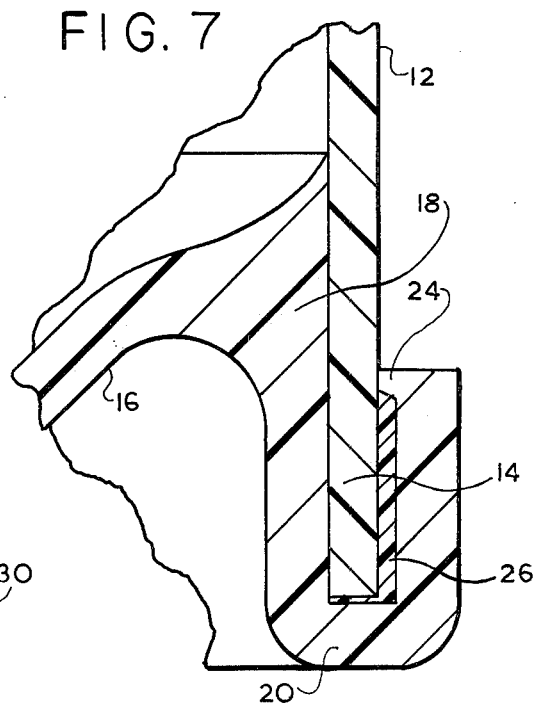
FIG. 7 is a similar view showing the bottom closure fully welded to the bottom end of the tube.

The parts are initially assembled and disposed as shown in FIG. 6 by the use of suitable jigs or fixtures, with working induction heating coils 28 and 30 arranged substantially as shown opposite the strand 26 of welding material and when actuated operate to supply the necessary amount of induction heating. At approximately the same time or shortly thereafter, pressure is applied against the exterior of flange 20 towards the bottom end 14 to force the molten plastic of the strand or slug 26 to flow and force itself into the available space or void between the bottom closure 16 and shell 12 and particularly between the flange 20, apron 18 and skirt 22 and the bottom end 14. In passing, it has been found that the welding material 26 fills any molding irregularities at the interface between the closures and the shell. Thus, the bottom closure 16 and shell 12 will assume the approximate disposition shown in FIG. 7 with the melted strand 26 filling the void and available space. The welding material 26 is then permitted to cool and where necessary or desirable, a cooling medium may be applied to expedite the cooling process. Thereafter, the bottom closure 16 will be firmly welded to the bottom end 14 of the shell 12 by means of the welding material 26 in the manner depicted by FIG. 7.

The top closure 32 is secured over the upper end 34 of the tube 12 to form a tight head by a similar welding technique. The top closure 32 will, as explained, be injection-molded and be provided with the usual filling and emptying neck opening 36 sealed by the closure cap or plug 38 as well as the optional venting neck opening 40 closed by the venting plug 42. Peripheral circumferentially extending skirt 44 is designed to engage and mate with the inner surfaces of the upper end 34 of the tube 12. This skirt 44 merges into a laterally and outwardly extending radial flange 46 from which extends a downwardly depending skirt 48. The skirt 48 terminates in an inwardly extending beveled flange 50, the lower end of which is proximite the exterior surfaces of the upper end 34 of the tube 12 for purposes which will be apparent shortly.

Figure 4:
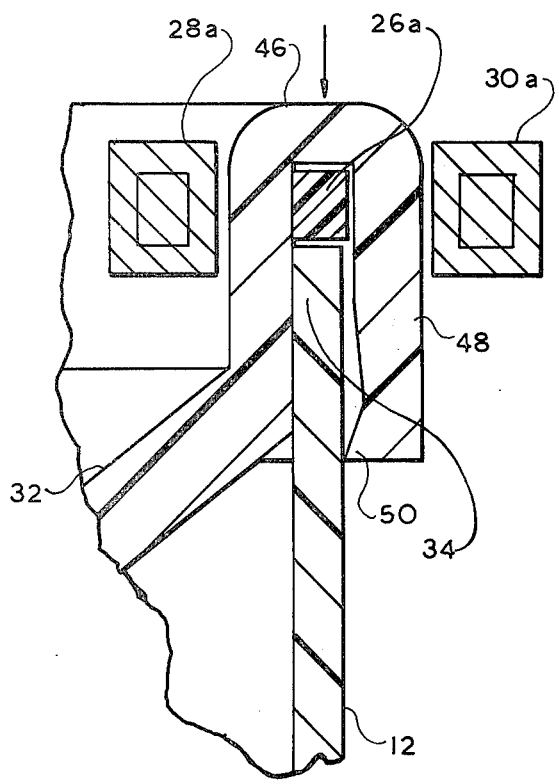
FIG. 4 is an enlarged sectional view diagrammatically illustrating the manner in which the top closure is applied to the upper end of the extruded tube prior to welding in forming the tight head for the drum of FIG. 1.
Figure 5:
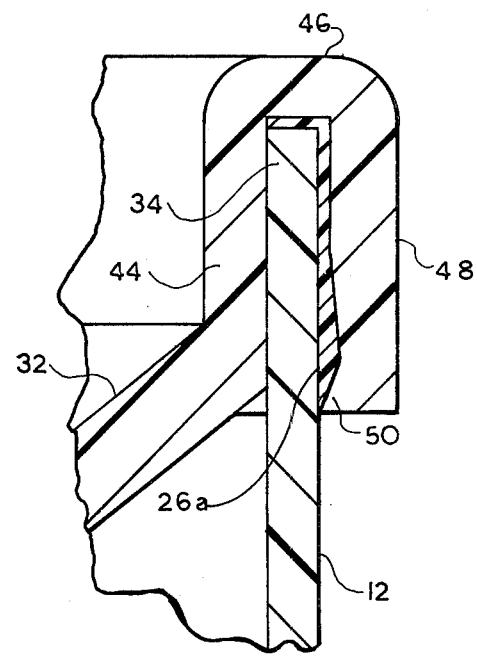
FIG. 5 is a similar view showing the top closure fully welded to the upper end of the tube.

In assembling the top closure 32 to the upper end 34 of the tube 12, the parts will be disposed essentially as represented in FIG. 4 with the aid of suitable jigs or fixtures. A strand or slug 26a of the selected welding material is interposed between the upper end 34 and flange 46 and between apron 44 and skirt 48. As in the case with strand 26a this welding material is preferably extruded from a relatively high density polyethylene containing iron powder that may be obtained from the EMA Bond Inc. The working induction heating coils 28a and 30a when actuated serve to excite the iron particles and thereby facilitate the melting of the polyethylene welding material. Upon energization of the induction heating coils 28a and 30a to melt the strand 26a, pressure is applied to the upper face of the flange 46 towards upper end 34 to compress the molten material. This welding material will flow and fill the void or available space between apron 44, flange 46, skirt 48 and flange 50 as shown in FIG. 5. The re-formed strand 26a is then permitted to cool and a top closure 32 is securely bonded to the upper end 34 of the tube 12 by means of the welding material 26a.

Figure 8:
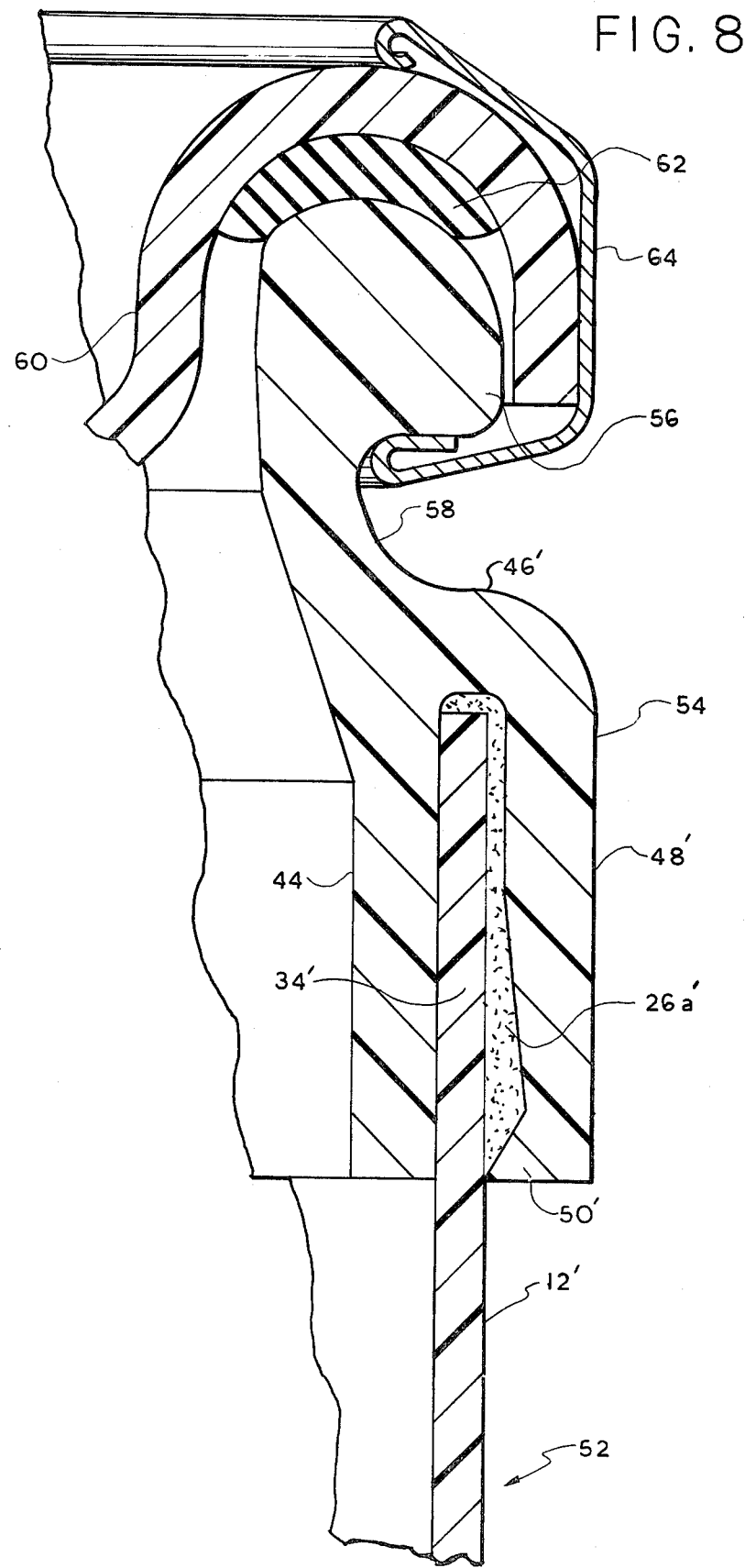
FIG. 8 is an enlarged fragmentary sectional view showing a chime welded to the upper end of the tube and a removable cover secured thereto by a locking rim assembly.

Referring now to FIG. 8, a further embodiment of the invention is illustrated in which an open head drum 52 is advantageously fabricated in accordance with the teachings of the present invention with an extruded tube 12' of selected diameter, length and wall thickness. A plastic chime 54 is injection-molded and preferably is formed of a high-density polyethylene material. The chime 54 is provided with an upper circumferentially extending bead 56, recess 58 and a flange 46' interposed between spaced, downwardly depending apron 44' and skirt 48'. The apron 44' is adapted to engage with the inner surfaces of the upper end 34' of the tube 12' while shoulder 46' and skirt 48' are spaced from this end. This cavity or space further defined by the inwardly extending flange 50' accommodates the reformed welding material 26a' identified in detail in the above. In sealing the removable cover 60 over the bead 56, a sealing gasket 62 of conventional design may be employed. A locking rim assembly 64 of conventional design may be employed in releasably locking the cover 62 of the chime 54.

Thus, the several aforenoted objects and advantages are most effectively attained. Although several similar preferred embodiments of the invention have been disclosed and described in detail herein, it should be understood that this invention is in no sense limited thereby and its scope is to be determined by that of the appended claims.

What is claimed is:

1. An essentiall all-plastic drum of selected capacity comprising in combination:
   an extruded tube defining the drum side wall of selected diameter and length proportional to the drum capacity desired and having an open upper end and an open bottom end;
   an injection molded bottom closure having an annular periphery assembled to the bottom end of the tube and defining a cavity therebetween, the bottom closure being welded to and closing the bottom end; and the weld between the bottom closure and the bottom end being defined by an induction melted welding material disposed in the cavity that was induction-heated and melted and under pressure caused to conform to the configuration of the cavity to bond to and secure together surfaces of the tube and bottom closure, the welding material being thermoplastic initially in the form of preformed material and includes excitable means which when exposed to induction heating causing the melting of the thermoplastic which flows under pressure into the cavity and when set forms an annular seal and causing the bonding by welding of the bottom closure to the tube, the bottom closure including a circumferentially extended peripheral apron mating and engaging with the inner surfaces of the bottom end of the tube, and that portion of the apron in the tube being in engagement substantially throughout with the inner surface of the tube, the apron having a lower end extending continuously beyond said bottom end and an annular flange extending radially outwardly from said lower end, and a circumferential skirt spaced from the exterior surfaces of the bottom end of the tube and extending upwardly from the flange and terminating in an inwardly extending annular flange disposed in sealing engagement with the exterior surfaces of the bottom end of the tube, with the apron, radial flange, skirt and inwardly extending flange cooperating with the bottom end of the tube in defining an L-shaped cavity for receiving the melted welding material when exposed to induction heating and pressure.

2. The invention in accordance with claim 1 wherein the welding material is thermoplastic, initially in the form of a preferred strand and includes dispersed iron particles that are excitable when exposed to induction heating to facilitate the melting of the thermoplastic during the bonding by welding of the bottom closure to the tube.

3. The invention in accordance with claim 1 wherein an injection molded top closure is assembled to the upper end of the tube and defines a second cavity therebetween, the top closure being welded to and closing the upper end; and the weld between the top closure and the upper end being defined by a meltable welding material disposed in the second cavity therebetween that is then induction heated and melted and under pressure caused to conform to the configuration of this second cavity to bond to and secure together surfaces of the tube and the top closure.

4. The invention in accordance with claim 3 wherein the top closure includes a circumferentially extended peripheral second apron adapted to mate and engage with inner surfaces of the upper end of the tube, the second apron having an upper end and a second flange extending radially outwardly therefrom, and a second skirt extending downwardly from the second flange and terminating in a second inwardly extending flange adapted to be disposed in proximity to exterior surfaces of the upper end of the tube with the second apron, radial flange, skirt and inwardly extending flange cooperating with the upper end of the tube in defining the second cavity for receiving the melted welding material when exposed to induction heating and pressure.

5. The invention in accordance with claim 4 wherein the welding material is thermoplastic initially in the form of a pre-formed strand and includes dispersed iron particles that are excitable when exposed to induction heating to facilitate the melting of the thermoplastic during the bonding by welding of the top closure to the tube.

6. The invention in accordance with claim 1 wherein an injection-molded chime is assembled to the upper end of the tube and defines a second cavity therebetween, the chime being welded to the upper end; and the weld between the chime and the upper end being defined by a meltable welding material disposed in the second cavity therebetween that was induction-heated and melted and under pressure caused to conform to the second cavity to bond to and secure together surfaces of the chime and upper end.

7. The invention in accordance with claim 6 wherein the chime includes a circumferentially extended second apron adapted to mate with inner surfaces of the upper end of the tube, the second apron having an upper end and a second flange extending radially outwardly therefrom, and a second skirt extending downwardly from the second flange and terminating in a second inwardly extending flange adapted to be disposed in proximity to exterior surfaces of the upper end of the tube with the second apron, radial flange, skirt and inwardly extending flange cooperating with the upper end of the tube in defining the second cavity for receiving the melted welding material when exposed to induction heating and pressure.

8. The invention in accordance with claim 7 wherein the welding material is thermoplastic initially in the form of a pre-formed strand and includes dispersed iron particles that are excitable when exposed to induction heating to facilitate the melting of the thermoplastic during the bonding by welding of the chime to the tube.

9. The invention in accordance with claim 7 wherein the chime is provided with an upper bead, a cover, the periphery of which extends over the bead, and a locking rim assembly releasably securing the cover over the bead to the chime.

10. The invention in accordance with claim 9 wherein a sealing gasket is interposed between the periphery of the cover and the bead to seal the juncture therebetween.

11. An essentially all plastic drum of selected capacity comprising in combination:

a tube defining the drum side wall of selected diameter and length proportional to the drum capacity desired and having an open upper end and a closed bottom end;

an injection-molded top closure having an annular periphery assembled to the upper end of the tube and defining a cavity therebetween, the top closure being welded to and closing the upper end; and the weld between the top closure and the upper end being defined by an induction melted welding material disposed in the cavity that was induction heated and melted and under pressure caused to conform to the configuration of the cavity to bond to and secure together the surfaces of the tube and the top closure, the welding material being thermoplastic initially in the form of preformed material and includes excitable means which when exposed to induction heating causing the melting of the thermoplastic which flows under pressure into the cavity and when set forms an annular seal and causing the bonding by welding of the top closure to the tube, the top closure including a circumferentially extended peripheral apron mating and engaging with the inner surfaces of the upper end of the tube, and that portion of the apron in the tube being in engagement substantially throughout with the inner surface of the tube, the apron having an upper end extending continuously beyond said upper end of said tube and an annular flange extending radially outwardly from said upper end of said apron a circumferential skirt spaced from the exterior surfaces of the upper end of the tube and extending downwardly from the flange and terminating in an inwardly extending annular flange disposed in sealing engagement with the exterior surfaces of the upper end of the tube, with the apron, radial flange, skirt and inwardly extending flange cooperating with the upper end of the tube in defining anti-shaped cavity for receiving the melted welding material when exposed to induction heating and pressure.

12. The invention in accordance with claim 11 wherein the welding material is thermoplastic initially in the form of a pre-formed strand and includes dispersed iron particles that are excitable when exposed to induction heating to facilitate the melting of the thermoplastic during the bonding by welding of the top closure to the tube.

13. An essentially all-plastic drum of selected capacity comprising in combination:
   a tube defining the drum side wall of selected diameter and length proportional to the drum capacity desired and having an open upper end and a closed bottom end;
   an injection molded chime having an annular periphery assembled to the upper end of the tube and defining a cavity therebetween, the chime being welded to the upper end; and
   the weld between the chime and the upper end being defined by an induction melted welding material disposed in the cavity that was induction-heated and melted and under pressure caused to conform to the configuration of the cavity to bond to and secure together surfaces of the chime and upper end, the welding material being thermoplastic initially in the form of preformed material and includes excitable means which when exposed to induction heating causing the melting of the thermoplastic which flows under pressure into the cavity and when set forms an annular seal and causing the bonding by welding of the chime to the tube, the chime including a circumferentially extended peripheral apron mating and engaging with the inner surfaces of the upper end of the tube, and that portion of the apron in the tube being in engagement substantially throughout with the inner surface of the tube, the apron having an upper end extending continuously beyond said upper end of said tube and an annular flange extending radially outwardly from said upper end of apron, a tubular extension extending outwardly beyond the radially extending flange and integrally joined to the upper end of said apron and a circumferential skirt spaced from the exterior surfaces of the upper end of the tube and extending downwardly from the flange and terminating in an inwardly extending annular flange disposed in sealing engagement with the exterior surfaces of the upper end of the tube, with the apron, radially extending flange, skirt and inwardly extending flange cooperating with the upper end of the tube in defining on L-shaped cavity for receiving the melted welding material when exposed to induction heating and pressure.

14. The invention in accordance with claim 13 wherein the welding material is thermoplastic initially in the form of a pre-formed strand and includes dispersed iron particles that are excitable when exposed to induction heating to facilitate the melting of the thermoplastic during the bonding by welding of the chime to the tube.

15. The invention in accordance with claim 13 wherein the chime is provided with an upper bead, a cover the periphery of which extends over the bead, and a locking rim assembly releasably securing the cover over the bead to the chime.

16. The invention in accordance with claim 15 wherein a sealing gasket is interposed between the periphery of the cover and the bead to seal the juncture therebetween.

* * * * *

UNITED STATES PATENT OFFICE
CERTIFICATE OF CORRECTION

Patent No. 4,201,306  Dated May 6, 1980

Inventor(s) Robert A. Dubois; George F. Smith

It is certified that error appears in the above-identified patent and that said Letters Patent are hereby corrected as shown below:

Column 7, line 22, "anti-shaped" should be --an L-shaped--;

Column 8, line 27, "on" should be --an--.

Signed and Sealed this

Twenty-ninth Day of July 1980

[SEAL]

Attest:

SIDNEY A. DIAMOND

Attesting Officer  Commissioner of Patents and Trademarks